United States Patent
Tanaka et al.

(12) 
(10) Patent No.: US 6,178,760 B1
(45) Date of Patent: Jan. 30, 2001

(54) ELECTRIC VEHICLE AIR CONDITIONER SYSTEM AND METHOD FOR EFFECTING DEFROSTING OPERATION BEFORE BATTERY CHARGING OPERATION

(75) Inventors: Masaya Tanaka; Kunio Iritani, both of Anjo (JP)

(73) Assignee: Denso Corporation, Kariya (JP)

( * ) Notice: Under 35 U.S.C. 154(b), the term of this patent shall be extended for 0 days.

(21) Appl. No.: 09/391,828

(22) Filed: Sep. 8, 1999

(30) Foreign Application Priority Data

Sep. 25, 1998 (JP) .................................................. 10-271202

(51) Int. Cl.[7] ................................ F25B 47/02; B60H 1/32

(52) U.S. Cl. ................................ 62/154; 62/155; 62/156; 62/230; 62/236

(58) Field of Search .............................. 62/151, 154, 155, 62/156, 230, 236, 140, 243, 244, 234, 228.4, 324.5, 160

(56) References Cited

U.S. PATENT DOCUMENTS

| | | | |
|---|---|---|---|
| 5,284,025 | * | 2/1994 | Kajitani et al. .................. 62/324.5 X |
| 5,305,613 | * | 4/1994 | Hotta et al. .......................... 62/236 X |
| 5,555,737 | | 9/1996 | Takeo et al. ............................. 62/230 |
| 5,586,448 | * | 12/1996 | Ikeda et al. ............................. 62/156 |

* cited by examiner

*Primary Examiner*—Harry B. Tanner
(74) *Attorney, Agent, or Firm*—Harness, Dickey & Pierce, PLC

(57) ABSTRACT

An air conditioner system for vehicles has an exterior heat exchanger, which is used as an evaporator at the time of heating operation. A control unit monitors the heating operation and stores a defrost flag when the heating operation continues for a predetermined time period, e.g., 20 minutes, under a low exterior air temperature below a predetermined temperature, e.g., 5° C. When an electric vehicle is at rest after the heating operation to charge its secondary battery with an electric power from an external power source, the control unit first starts a defrosting operation and starts a charging operation of the secondary battery after the completion of the defrosting operation.

20 Claims, 6 Drawing Sheets

FIG. 2A

| INPUT | OUTPUT | | | |
|---|---|---|---|---|
| MODE OF REFRIGERATION CYCLE | EMV 62 | EMV 63 | EMV 64 | 4-SV 57 |
| OFF | OFF | OFF | OFF | OFF (—) |
| COOLING | OFF | OFF | OFF | ON (---) |
| HEATING | ON | OFF | OFF | OFF (—) |
| DEFROSTING | OFF | OFF | OFF | ON (---) |
| DEHUMIDIFYING  H | OFF | OFF | ON | OFF (—) |
| DEHUMIDIFYING  C | OFF | ON | OFF | OFF (—) |

FIG. 2B

| INPUT | | | | OUTPUT |
|---|---|---|---|---|
| MODE OF REFRIGERATION CYCLE 55 | COMP. 56 | SENSOR OUTPUT | | MODE OF FAN 89 |
| COOLING | ON | Tam  22  25 (°C) | | Hi |
| | | | | Lo |
| HEATING | ON | Tam  13  16 (°C) | | Hi |
| | | | | Lo |
| DEHUMIDIFYING  H | ON | Te  2  3  4 (°C) | | Hi |
| | | | | Lo |
| | | | | OFF |
| DEHUMIDIFYING  C | ON | Pd  17 18 (kgf/cm²G) 19 | Td  109 110 (°C) | Hi |
| | | | | Lo |
| | | | | OFF |

ELECTRIC VEHICLE AIR CONDITIONER SYSTEM AND METHOD FOR EFFECTING DEFROSTING OPERATION BEFORE BATTERY CHARGING OPERATION

CROSS-REFERENCE TO RELATED APPLICATION

This application relates to and incorporates herein by reference Japanese Patent Application No. 10-271202 filed on Sep. 25, 1998.

BACKGROUND OF THE INVENTION

The present invention relates to an air conditioner system and method for electric vehicles.

Heat pump type air conditioner systems employing electrically-driven compressors are used widely as air conditioners mounted on electric vehicles from the standpoint of ensuring a self heat generating source, reducing air pollution and saving electric power energy. In those heat pump type air conditioner systems, however, the exterior heat exchanger is used as an evaporator at the time of heating operation to exchange heat between low temperature, low pressure refrigerant and exterior air. Thus, frosting occurs on the surface of the heat exchanger at the time of heating operation. The frosting lessens the operation performance of exchanging heat with the exterior air and hence the heating operation performance.

U.S. Pat. No. 5,555,737 (JP-A-7-212902) proposes to defrost the heat exchanger in the course of battery charging by using excess electric power generated immediately before completing the battery charging. The heat exchanger will not be defrosted sufficiently when the battery charging is stopped midway of the battery charging, that is, before the battery charging is completed. As a result, a sufficient heating performance for a quick heating (warm-up) cannot be provided as the heating operation starts with frost still remaining on the heat exchanger.

SUMMARY OF THE INVENTION

It is therefore an object of the present invention to provide an electric vehicle air conditioner system and method vehicles which ensures a defrosting operation to improve a heating operation.

According to the present invention, an air conditioner system for electric vehicles has an exterior heat exchanger, which is used as an evaporator at the time of heating operation. A control unit monitors the heating operation during a vehicle running. When an electric vehicle is at rest after the heating operation to charge its secondary battery with an electric power from an external power source, the control unit checks whether the monitored heating operation continued for a predetermined time period under a low exterior air temperature below a predetermined temperature. The control unit drives a refrigeration cycle for a defrosting operation and starts a charging operation of the secondary battery after the completion of the defrosting operation, when the control unit determines that the heating operation continued for the predetermined time period. Preferably, the control unit varies a defrosting operation period to be longer as the exterior air temperature is lower.

Alternatively, the control unit executes the defrosting operation when a compressor rotation speed and a refrigerant pressure in a refrigeration cycle are within a defrosting range determined by the compressor rotation speed and the refrigerant pressure.

BRIEF DESCRIPTION OF THE DRAWINGS

The above and other objects, features and advantages of the present invention will become more apparent from the following detailed description made with reference to the accompanying drawings. In the drawings:

FIGS. 2A and 2B are tables showing, respectively, relations among electromagnetic valves and a four-way switching valve in each operation mode of the embodiment, and relations among compressor operations, sensor outputs and exterior fan operations in each operation mode of the embodiment;

DETAILED DESCRIPTION OF THE PREFERRED EMBODIMENT

The present invention will be described in more detail with reference to various embodiments.

Figure 1:
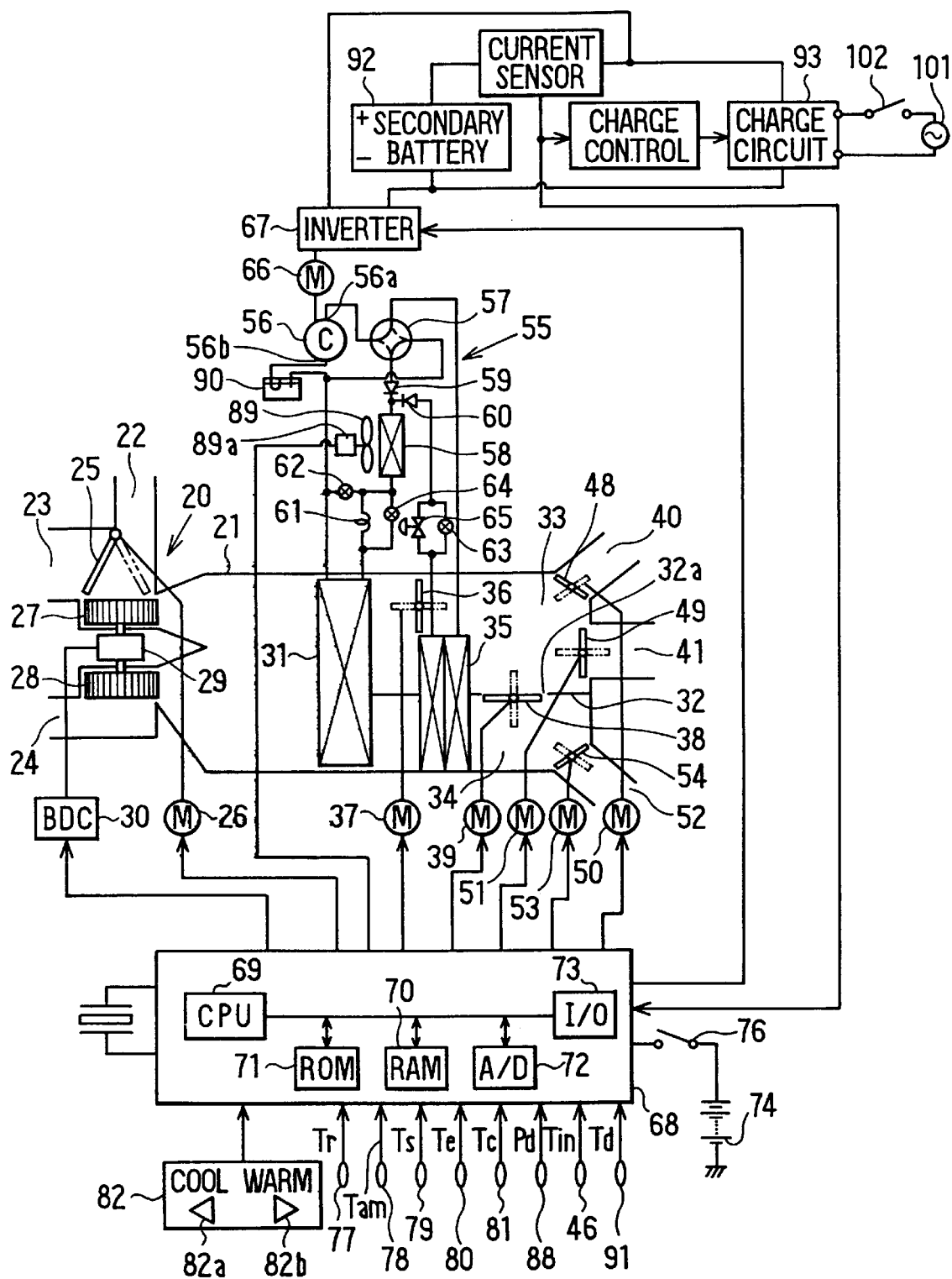
FIG. 1 is a schematic diagram showing an air conditioner system for electric vehicles according to a embodiment of the present invention.

Referring first to FIG. 1, an air conditioner system 20 for electric vehicles has an air blower casing 21, which is provided with an exterior air inlet 22 for introducing ambient or exterior air, and a pair of interior air inlets 23 and 24 for introducing interior air in a vehicle compartment. An interior/exterior air mixing damper 25 is mounted between the exterior air inlet 22 and the interior air inlet 23.

The damper 25 is driven by a servo motor 26 to variably regulate the ratio of mixing the air introduced from the exterior air inlet 22 and the interior air inlets 23 and 24, so that the intake air temperature is varied. Blowers 27 and 28 are mounted downstream of the damper 25 and the interior air inlets 23 and 24, respectively. The blowers 27 and 28 are coupled with a rotary shaft of a blower motor 29, which is driven by a blower driving circuit (BDC) 30.

An evaporator 31 is disposed downstream of the blowers 27 and 28, and the downstream side of the evaporator 31 is divided into two air passages, an upper air passage and a lower air passage, by a partition plate 32.

A condenser 35 is disposed in the lower air passage as an interior heat exchanger. The upper part of the condenser 35 extends into the upper air passage 33. A forced-cooling damper 36 is disposed above the condenser 35, so that the damper 36 is driven by a servo motor 37 to vary the amount of air bypassing the condenser 35.

A communication damper 38 is disposed in a communication opening 32a provided in the partition plate 32 at the downstream of the condenser 35. The communication damper 38 is driven by a servo motor 39 to vary the amount of air passing through the communication opening 32a of the partition plate 32, so that the resistance to air flow is reduced in the single operation mode such as a FACE mode and a DEF mode.

A defroster air outlet 40 and a face-side air outlet 41 are provided at the downstream side of the upper air passage 33. Dampers 48 and 49 are provided in the air outlets 40 and 41 to be driven by servo motors 50 and 51, respectively. A foot-side air outlet 52 is provided at the downstream side of the lower air passage 34. A damper 54 is provided in the foot-side air outlet 52 to be driven by a servo motor 53.

The evaporator 31 and the condenser 35 are a part of a refrigeration cycle of a heat pump type. This refrigeration cycle 55 also includes a compressor 56, a four-way switching valve 57, an exterior heat exchanger 58, check valves 59 and 60, a capillary 61, electromagnetic valves 62, 63 and 64, a pressure decreasing valve 65, and an accumulator 90. Those parts of the refrigeration cycle 55 are connected operatively through pipes.

The electromagnetic valves (EMV) 62, 63, 64 and the four-way valve (4-SV) 57 are turned on or off as defined in the table shown in FIGS. 2A and 2B in correspondence with operation modes of the refrigeration cycle 55.

As understood from the table, in the heating mode, the four-way valve 57 is switched to the off-position as shown by a solid line in FIG. 1, so that the refrigerant discharged from the outlet 56a of the compressor 56a recirculates to the inlet 56b of the compressor 56 through the condenser 35, pressure reducing valve 65, check valve 60, exterior heat exchanger 58, electromagnetic valve 62 and accumulator 90. Thus, the high temperature gas refrigerant discharged from the outlet 56a of the compressor 56 radiates heat and is liquefied in the condenser 35 to heat the air passing therethrough with the radiated heat.

In the dehumidifying mode (H) shown in FIGS. 2A and 2B, the four-way switching valve 57 is switched to the position shown by a solid line in FIG. 1 and the electromagnetic valves 63 and 64 are turned off and on, respectively. Thus, a part of the liquefied refrigerant supplied to the exterior heat exchanger 58 is also supplied to the evaporator 31, which in turn dehumidify the air passing therethrough by its cooling operation. As the heat absorbed in the evaporator 31 and the exterior heat exchanger 58 is radiated in the condenser 35, which re-heats the cooled and dehumidified air, the air passing through the condenser 35 has an increased air temperature.

In the dehumidifying mode (C) shown in FIGS. 2A and 2B, the four-way switching valve 57 is switched to the position shown by the solid line in FIG. 1, and the electromagnetic valve 63 is turned on so that the exterior heat exchanger 58 operates as the condenser as well as the condenser 35. Thus, the refrigerant liquefied by the condenser 35 and the exterior heat exchanger 58 is supplied to the evaporator 31, and the evaporator 31 cools the air passing therethrough by its cooling operation. In this dehumidifying mode (C), the heat absorbed by the evaporator 31 is radiated by both of the condenser 35 and the exterior heat exchanger 58, the air passing through the evaporator 31 has a decreased air temperature.

Here, the exterior heat exchanger 58 has an exterior fan 89 driven by a fan motor 89a for forced cooling. The fan motor 89a is switched to a high speed "Hi", a low speed "Lo" and a stop "OFF" in correspondence with the operation modes of the refrigeration cycle 55 and the output data of various sensors as shown in FIG. 2B. For instance, in the cooling mode, the fan motor speed is switched to "Hi" when the exterior air temperature Tam detected by an exterior air temperature sensor 78 rises above 25° C., while it is switched to "Lo" when the exterior air temperature Tam falls below 22° C. In the heating mode, on the other hand, the fan motor speed is switched to "Hi" when the exterior air temperature Tam falls below 25° C., while it is switched to "Lo" when the exterior air temperature Tam rises above 16° C.

A motor 66 for the compressor 56 in the refrigeration cycle 55 is driven by an inverter 67. The inverter 67 converts a direct current electric power of 200–300 V supplied from a secondary battery 92, which is an electric power source for a vehicle running, into an alternating current electric power, so that the rotation speed of the motor 66 is controlled in accordance with the alternating current frequency of the alternating current electric power. The secondary battery 92 is rechargeable by an external electric power source 101 through a charge circuit 93.

An electronic air conditioner control unit (air conditioner ECU) 68 is provided to control the inverter 67, the servo motors 26, 37, 39, 50, 51 and 53, the fan motor 89a for the exterior fan 89, and the driving circuit 30 for the blower motor 29.

The air conditioner ECU 68 comprises primarily, as known well in the art, a CPU 69, RAM 70, ROM 71, A/D converter 72, I/O circuit 73 and the like, and is rendered operative with the electric power supplied from a storage battery 74 through an key switch 76.

The air conditioner ECU 68 receives various detection signals from the following sensors. An interior air temperature sensor 77 detects an interior or compartment room air temperature Tr, and an exterior air temperature sensor 78 detects the exterior or ambient air temperature Tam. A solar radiation sensor 79 detects a solar radiation Ts incident to a vehicle compartment. An evaporator outlet temperature sensor 80 detects the temperature Te of the outlet of the evaporator 31, and a condenser outlet temperature sensor 81 detects the temperature of air immediately downstream of the condenser 35 (condenser outlet temperature) Tc. A refrigerant discharge pressure sensor 88 detects the refrigerant discharge pressure Pd of the compressor 56. An intake air temperature sensor 46 detects the temperature of air taken into the evaporator 31 (intake air temperature) Tin, and a refrigerant discharge temperature sensor 91 detects the discharged refrigerant temperature Td.

Figure 3:
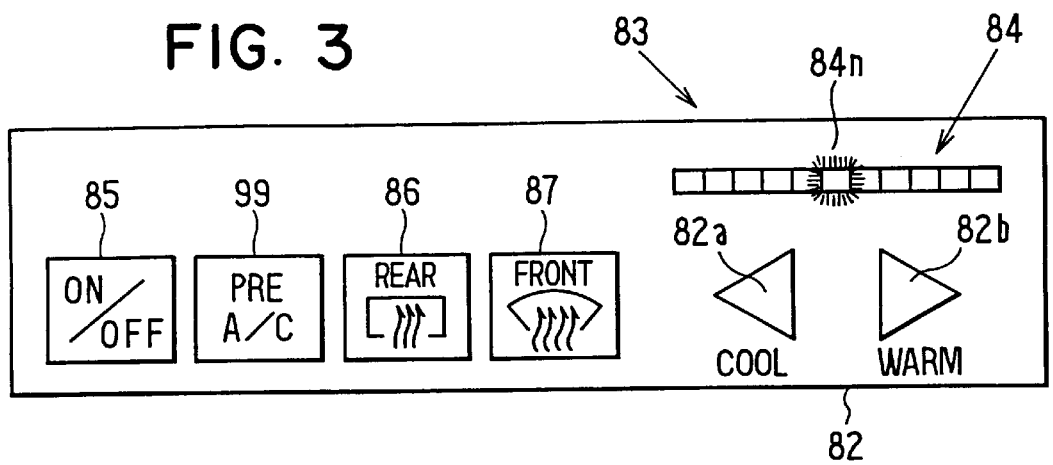
FIG. 3 is a front view showing a air conditioner control panel in the embodiment.

Further, the ECU 68 receives a signal from a temperature setting device 82, by which a sense of temperature Sset as a temperature control target is instructed manually by passengers. The temperature setting device 82 has a cooling key 82a and a warming key 82b, and is provided on an air conditioner control panel 83 as shown in FIG. 3. Further, the ECU 68 receives instruction signals from an air conditioner switch 85, a rear defogger switch 86, a front defroster switch 87, and a pre-air conditioning switch 99, which are provided on the air conditioner control panel 83 to be operated by the passengers.

Figure 4A:
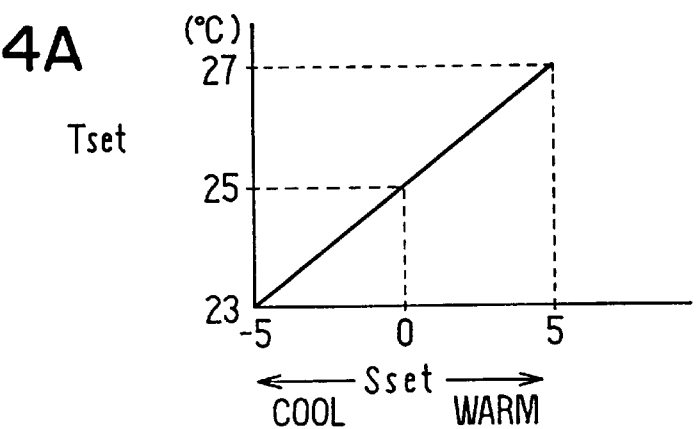
FIGS. 4A, 4B and 4C are graphs showing, respectively, a relation between a temperature feeling and a set temperature in the embodiment, a relation between an exterior air temperature and an exterior air temperature deviation in the embodiment, and a relation between a solar radiation and a solar radiation deviation in the embodiment.

The air conditioner control panel 83 also has a temperature display 84, in which a plurality of light emitting elements 84n are arranged in line in the lateral direction, above the temperature setting device 82. The temperature display 84 is for displaying the set sense of temperature Sset as a rough target of a set temperature Tset which is varied by the cooling key 82a and the warming key 82b. The sense of temperature Sset is an indication of the degree of cooling and warming relative to a reference temperature 25° C. as shown in FIG. 4A.

Figure 5:
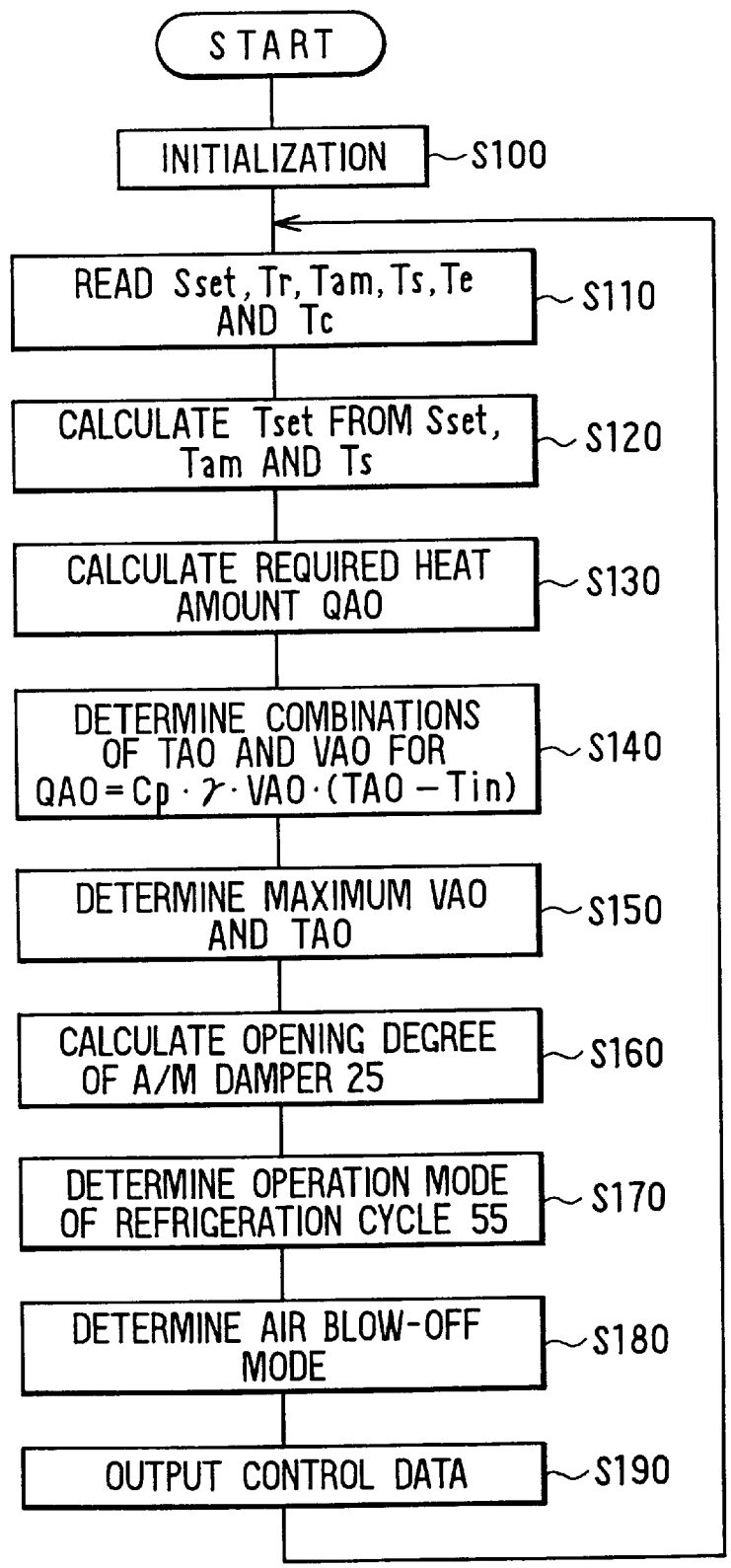
FIG. 5 is a flow diagram showing an entire operation of an air conditioner control unit in the embodiment.
Figure 6:
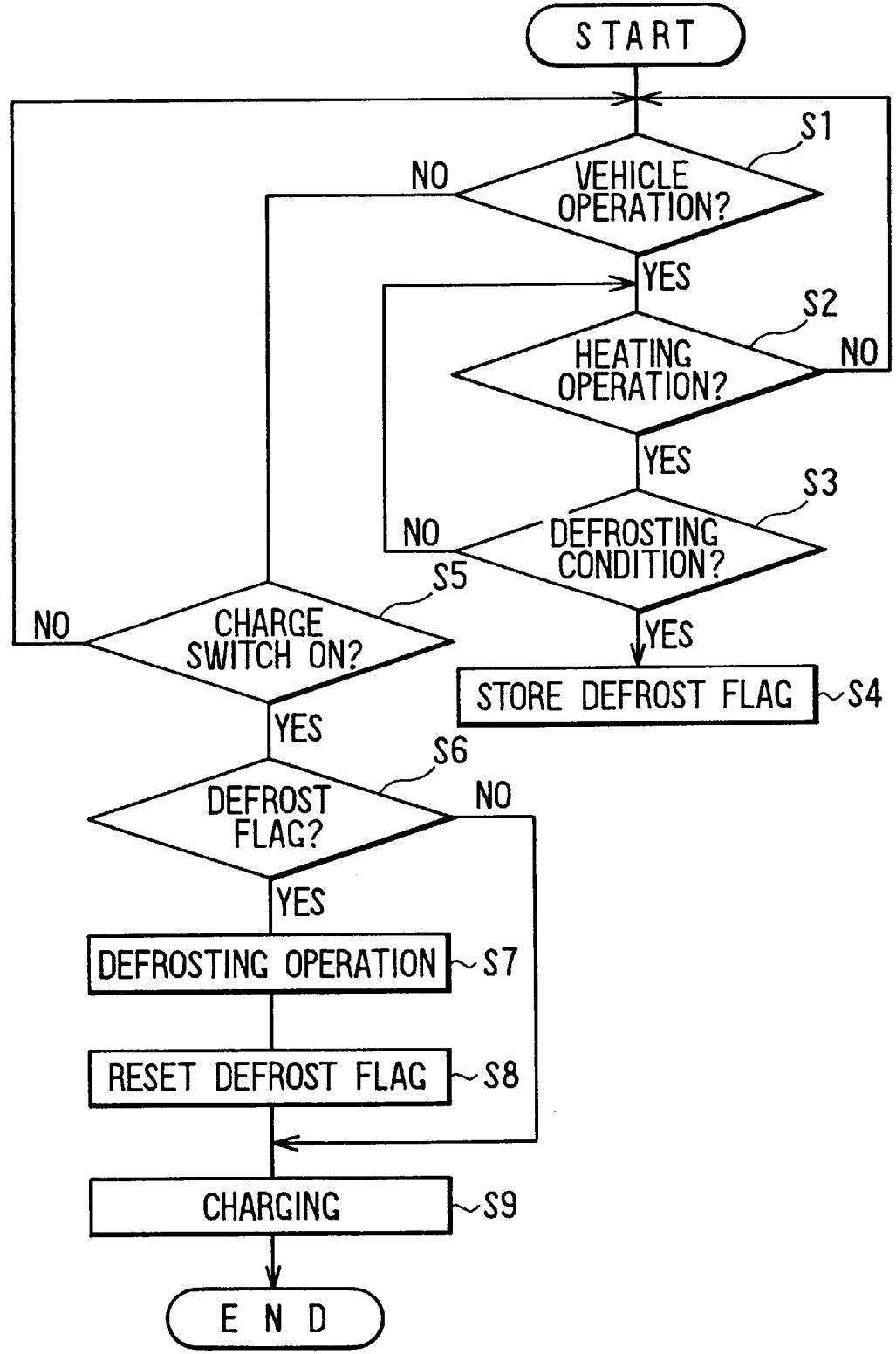
FIG. 6 is a flow diagram showing a defrosting operation of the air conditioner control unit in the embodiment.

The ECU 68, particularly the CPU 69, is programmed to execute various controls shown in FIGS. 5 and 6.

First, counters and flags to be used in the following controls are initialized at step S100, and then various instruction signals and detection signals are read in at step S110. The instruction signals include the sense of temperature Sset, and the detection signals include the interior air temperature Tr, exterior air temperature Tam, solar radiation Ts, evaporator outlet temperature Te, condenser outlet temperature Tc, and intake air temperature Tin.

The set temperature Tset is calculated as a function of the set sense of temperature Sset, the exterior temperature Tam and the solar radiation Ts, based on the following equation (1).

$$Tset = f(Sset, Tam, Ts) = Tset' + \Delta Tam + \Delta Ts$$

Figure 4B:
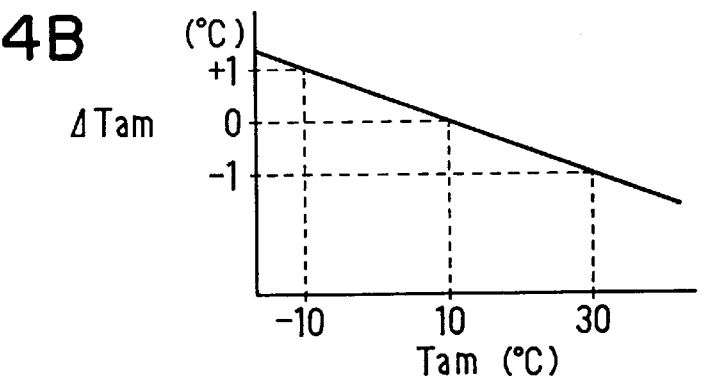
Figure 4C:
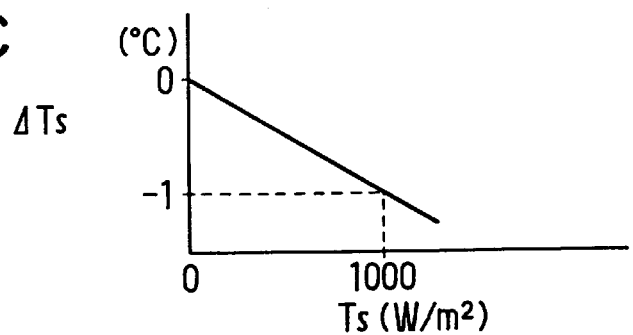

Here, as shown in FIGS. 4A to 4C, Tset', $\Delta$Tam and $\Delta$Ts are defined as Tset'=25+0.4·Sset, Tam=(10−Tam)/20, and Ts=−Ts/1000.

Then, the heat amount QAO required to maintain the interior air temperature at the set temperature Tset is calculated based on the following equation (2) at step S130, with K1, K2, K3, K4 and C being constants.

$$QAO = K1 \cdot Tset - K2 \cdot Tr - K3 \cdot Tam - K4 \cdot Ts + C$$

Next, combinations of a blow-off air temperature TAO and a blow-off air amount VAO which satisfy the following equation (3) are determined at step S140. In this equation (3), Cp, $\gamma$, and Tin indicate the specific heat of air, the specific gravity of air and the temperature of air taken in the evaporator 31.

$$QAO = Cp \cdot \gamma \cdot VAO \cdot (TAO - Tin)$$

The maximum blow-off air amount VAO and the blow-off air temperature TAO at that time, which further satisfy the following equation (4) are determined at step S150 from the combinations of the blow-off air temperature TAO and the blow-off air temperature VAO, which satisfy the above equation (3).

$$S = k1 \cdot \{k2 + k3 \cdot (ta-25) - k4 \cdot (va-3) + k5 \cdot (St-k6)\} - k7$$

In the above equation (4), S indicates the sense of temperature which is an indicator of comfort of air conditioning, ta the temperature (°C.) of air blow-off to passengers, va the flow speed (m/s) of blow-off air, St the solar radiation (kcal/m²h) impinging on passengers, and k1 to k7 constants.

The parameter S is set to between −1 and 0 in summer time (cooling operation) and between 0 and +1 in winter time (heating operation) from the standpoint of both comfort and electric power saving in electric vehicles according to the embodiment. In normal engine-powered vehicles in which less electric power saving is required, the parameter S is set to −2 in summer time and to +2 in winter time from the standpoint of comfort.

The temperature of air ta blow-off to passengers may be calculated from the following equation (5).

$$Ta = TAO \cdot Kt \cdot \sqrt{C'A}/X^m$$

Here, Kt indicates a constant determined by the configuration of the air outlet, C' a flow reduction constant, A an area of opening of the air outlet, X a distance from the air outlet to passengers, and m an index determined by the configuration of the air outlet.

The air flow speed va may be calculated from the following equation (6), with Kv and n being constants determined by the configuration of the air outlet.

$$Va = VAO \cdot Ka \cdot \sqrt{C'A}/X^n$$

The solar radiation St impinging on passengers may be calculated from the following equation (7), with Ks being a constant determined by the solar sensor characteristics and Ts being the output of the solar sensor 79.

$$St = Ks \cdot Ts$$

Thus, the maximum blow-off air amount VAO and the blow-off air temperature TAO which satisfy the equation (4) are determined by the use of the equations (1) to (3). The blow-off air temperature TAO is set a little higher than conventional at the time of cooling operation, and the blow-off air temperature TAO is set a little smaller than conventional at the time of heating operation. The blow-off air amount VAO is set a little larger in both cooling operation and heating operation than conventional.

Following step S150, at step S160, the opening degree of the interior/exterior air mixing damper 25 is calculated to reduce the temperature difference between the intake air temperature Tin and the blow-off air temperature TAO. The operation mode of the refrigeration cycle 55 is determined to either one of the cooling operation or the heating operation at step S170.

The opening degrees of the dampers 36, 38, 48, 49 and 54 are determined at step S180 based on the blow-off air temperature TAO and the blow-off air amount VAO calculated at step S150. Further, the blow-off mode is determined to either one of "FACE", "B/L", "FOOT", "FOOT/DEF" and "DEF". Finally, at step S190, the ECU 68 outputs the control data calculated and determined as above to corresponding actuator driving circuits.

The ECU 68 further controls the defrosting operation as shown in FIG. 6.

First, it is checked at step S1 whether the vehicle is in operation. If the determination at step S1 is YES, it is further checked at step S2 whether the air conditioner 20 is in the heating operation. In response to YES determination at step S2, it is further checked at step S3 whether the defrosting condition holds. If the determination is NO at step S2, the processing returns to step S1. The defrosting condition holds when the heating operation continues more than 30 minutes under the condition that the exterior air temperature is below 5° C. A defrost flag is stored at step S4 in response to YES determination at step S3, while the processing returns to heating operation checking step S2 in response to NO determination at step S3.

If the determination at step S1 is NO, it is checked at step S5 whether a battery charge switch 102 is turned on, that is, whether it is the time to charge the secondary battery 92. If the determination at step S5 is NO, the processing returns to step S1. If the determination at step S5 is YES, it is further checked at step S6 whether the defrost flag is stored.

The defrosting operation is continued for a predetermined period, e.g., 20 minutes, at step S7. After the defrosting period, the defrost flag is reset at step S8 to discontinue the defrosting operation. The battery charging is started at step S9. The electric power required for the defrosting operation is supplied from the external power source 101 and not from the secondary battery 92.

Figure 7:
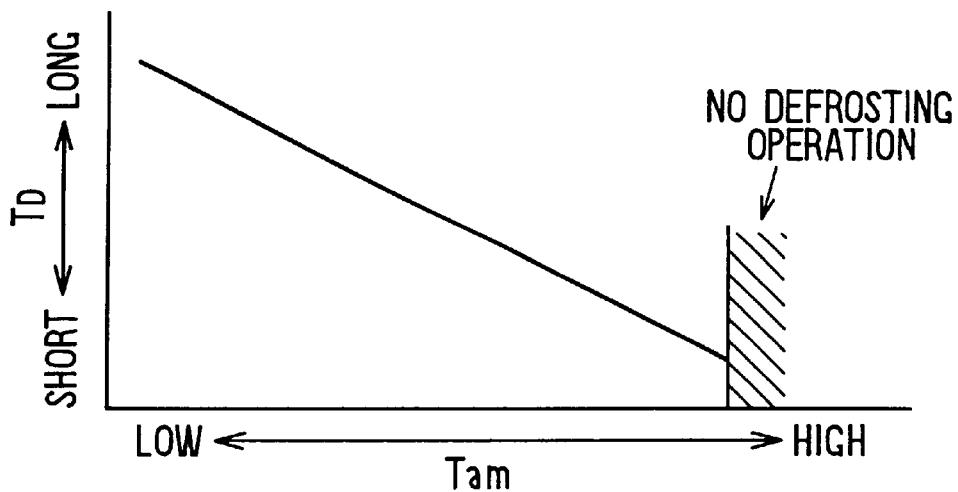
FIG. 7 is a graph showing a relation between an exterior air temperature and a defrosting time period in a modified embodiment.

It is preferred to variably set the defrosting time period $T_D$ in dependence on the exterior air temperature Tam. That is, as shown in FIG. 7, the defrosting time period $T_D$ is set longer as the exterior air temperature Tam is lower. Further, it is preferred to disable the defrosting operation at temperatures above a predetermined reference. Thus, the defrosting operation can be reduced to a necessary minimum to save the electric power consumption.

It is also preferred to design the air conditioner system 20 to be operable with both 100 V and 200V of the external power source 101. As the defrosting performance becomes high when operated with 200 V external power source, the defrosting time period $T_D$ is shortened than in the case of operation with 100 V external power source to improve the defrosting efficiency.

The air conditioner system described above provides the following advantages.

(a) As it is checked based on the presence and absence of the defrost flag whether the defrosting operation is required, the system configuration is simplified. That is, it is not required to detect the refrigerant temperature at the outlet of the exterior heat exchanger and check whether the defrosting is necessary based on the detected refrigerant temperature.

(b) As the battery charging is started after the defrosting operation is completed, the defrosting is completed when the vehicle is operated next time. Thus, the heating performance is not lessened at the next heating operation even when the battery charging is stopped before full battery charging.

In the air conditioner system using the heat pump cycle, the warm or heated air is generated by the use of condensing heat in the interior heat exchanger at the time of heating operation. In this instance, the condensing heat depends on the refrigerant pressure. This refrigerant pressure is dependent on the rotation speed Nc of the compressor 56. If the exterior heat exchanger has no frost thereon (normal operation), the rotation speed Nc has a normal balanced relation relative to the refrigerant pressure Pd as shown in FIG. 8.

However, when the exterior heat exchanger has frost thereon, the frost reduces the amount of heat exchange with the exterior air. Thus, the refrigerant pressure at the low pressure side is lowered, and the refrigerant pressure at the high pressure side is lowered responsively. As a result, the heating performance is lessened. Therefore, it is desired to raise the rotation speed Nc of the compressor for maintaining the same refrigerant pressure Pd. Here, the rotational speed of the compressor 56 may be detected by the inverter 67 from the waveform of the counter electromotive force generated in the motor 66.

Figure 8:
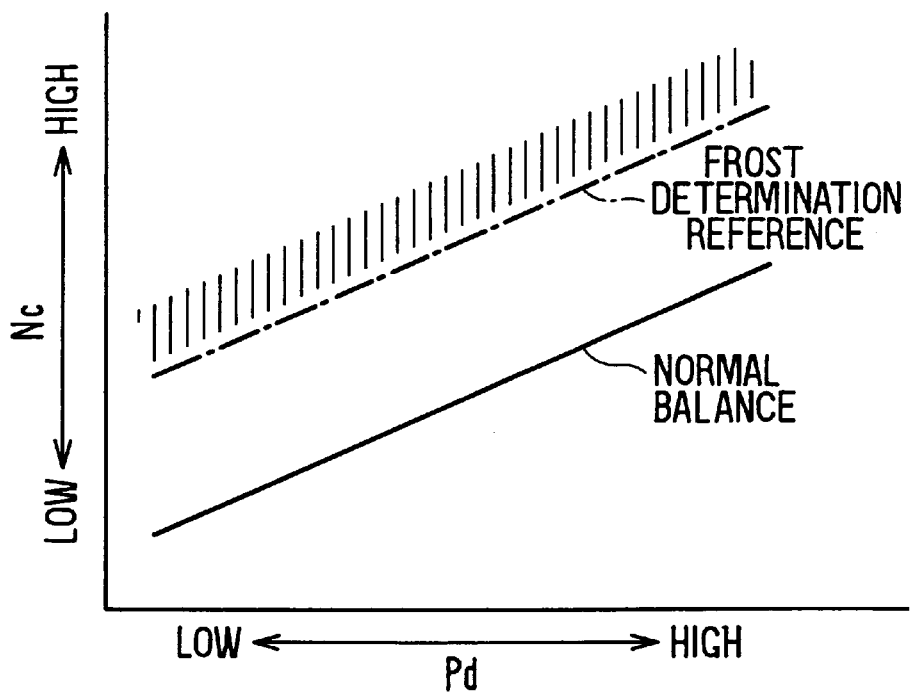
FIG. 8 is a graph showing a relation between a high pressure and a compressor rotation speed in another modified embodiment.

According to a modified embodiment, a frosting determination reference is determined as shown by the dot-and-chain line in FIG. 8 and stored in the ECU 68, preferably in EEPROM. This reference defines the relation between the refrigerant pressure and the compressor rotation speed Nc. The rotation speed Nc may be detected by a rotation sensor (not shown) attached to the compressor 56, and the refrigerant pressure may be detected by a pressure sensor (not shown) disposed in a refrigerant pipe in FIG. 1. In this instance, step S3 in FIG. 6 is modified to check whether the defrosting condition holds, that is, whether the operation point determined by the refrigerant pressure and the compressor rotation speed Nc is above the reference line in FIG. 8. This modified embodiment also provides a similar advantage as the above advantage (b).

The present invention having been described above may be modified further without departing from the spirit and scope of the present invention.

What is claimed is:

1. An air conditioner system for an electric vehicle chargeable with an external electric power source and having a refrigeration cycle, comprising:

a secondary battery mounted on the vehicle;

charge means for charging the secondary battery with the electric power from the external power source;

a compressor disposed in the refrigeration cycle and driven electrically with an electric power supplied from one of the secondary battery and the external power source for compressing a refrigerant;

an exterior heat exchanger disposed in the refrigeration cycle at a position exterior to a vehicle compartment; and control means for controlling the refrigeration cycle for an air conditioning operation in which the exterior heat exchanger operates as an evaporator in a heating operation, control means being further for controlling the refrigeration cycle to execute a defrosting operation prior to a charging operation of the charge means when a charging of the secondary battery is instructed under a condition that the defrosting operation is required.

2. An air conditioner system of claim 1, wherein the control means is further for shortening a period of the defrosting operation as a voltage of the external power source is higher.

3. An air conditioner system of claim 1, wherein the control means controls is further for executing the defrosting operation with only the electric power of the external power source.

4. An air conditioner system for an electric vehicle chargeable with an external electric power source and having a refrigeration cycle, comprising:

a secondary battery mounted on the vehicle;

charge means for charging the secondary battery with the electric power from the external power source;

a compressor disposed in the refrigeration cycle and driven electrically with an electric power supplied from one of the secondary battery and the external power source for compressing a refrigerant;

an exterior heat exchanger disposed in the refrigeration cycle at a position exterior to a vehicle compartment, the exterior heat exchanger being for operating as an evaporator in a heating operation;

detecting means for detecting an exterior air temperature;

measuring means for measuring a heating period of the heating operation;

storing means for storing a defrost flag when the measured heating period exceeds a predetermined period under a condition that detected exterior air temperature is below a predetermined temperature; and control means for controlling the refrigeration cycle to execute a defrosting operation prior to a charging operation of the charge means in response to the stored defrost flag when a charging of the secondary battery is instructed.

5. An air conditioner system of claim 4, wherein the control means is for stopping the defrosting operation when the detected exterior air temperature exceeds the predetermined temperature for a predetermined period.

6. An air conditioner system of claim 4, wherein the control means is for stopping the defrosting operation when a defrosting operation period exceeds a predetermined period.

7. An air conditioner system of claim 4, wherein a defrosting operation period is set longer as the detected exterior air temperature is lower.

8. An air conditioner system for an electric vehicle chargeable with an external electric power source and having a refrigeration cycle, comprising:
- a secondary battery mounted on the vehicle;
- charge means for charging the secondary battery with the electric power from the external power source;
- a compressor disposed in the refrigeration cycle and driven electrically with an electric power supplied from one of the secondary battery and the external power source for compressing a refrigerant;
- an exterior heat exchanger disposed in the refrigeration cycle at a position exterior to a vehicle compartment, the exterior heat exchanger being for operating as an evaporator in a heating operation;
- detecting means for detecting an exterior air temperature;
- measuring means for measuring a heating period of the heating operation;
- storing means for storing a defrost flag when the measured heating period exceeds a predetermined period under a condition that detected exterior air temperature is below a predetermined temperature; and
- control means for controlling the refrigeration cycle to start a defrosting operation in response to the stored defrost flag and starting a charging operation of the charge means after the defrosting operation.

9. An air conditioner system of claim 8, wherein the control means is for stopping the defrosting operation when the detected exterior air temperature exceeds the predetermined temperature for a predetermined period.

10. An air conditioner system of claim 8, wherein the control means is for stopping the defrosting operation when a defrosting operation period exceeds a predetermined period.

11. An air conditioner system of claim 8, wherein a defrosting operation period is set longer as the detected exterior air temperature is lower.

12. An air conditioner system for an electric vehicle chargeable with an external electric power source and having a refrigeration cycle, comprising:
- a secondary battery mounted on the vehicle;
- charge means for charging the secondary battery with the electric power from the external power source;
- a compressor disposed in the refrigeration cycle and driven electrically with an electric power supplied from one of the secondary battery and the external power source for compressing a refrigerant;
- an exterior heat exchanger disposed in the refrigeration cycle at a position exterior to a vehicle compartment, the exterior heat exchanger being for operating as an evaporator in a heating operation;
- detecting means for detecting a rotation speed of the compressor;
- detecting means for detecting a pressure of a refrigerant in the refrigeration cycle;
- storing means for storing a frost determination reference as a function between a compressor rotation speed and a refrigerant pressure to define a defrosting operation region;
- storing means for storing a defrost flag when the detected rotation speed and the detected refrigerant pressure are in the defrosting operation region; and
- control means for controlling the refrigeration cycle to execute a defrosting operation prior to a charging operation of the charge means in response to the stored defrost flag when a charging of the secondary battery is instructed.

13. An air conditioner system of claim 12, wherein the control means is further for stopping the defrosting operation when the detected refrigerant pressure exceeds a predetermined pressure.

14. An air conditioner system of claim 13, wherein the control means is further for setting the predetermined pressure to be lower as an exterior air temperature is lower.

15. An air conditioner system for an electric vehicle chargeable with an external electric power source and having a refrigeration cycle, comprising:
- a secondary battery mounted on the vehicle;
- charge means for charging the secondary battery with the electric power from the external power source;
- a compressor disposed in the refrigeration cycle and driven electrically with an electric power supplied from one of the secondary battery and the external power source for compressing a refrigerant;
- an exterior heat exchanger disposed in the refrigeration cycle at a position exterior to a vehicle compartment, the exterior heat exchanger being for operating as an evaporator in a heating operation;
- detecting means for detecting a rotation speed of the compressor;
- detecting means for detecting a pressure of a refrigerant in the refrigeration cycle;
- storing means for storing a frost determination reference as a function between a compressor rotation speed and a refrigerant pressure to define a defrosting operation region;
- storing means for storing a defrost flag when the detected rotation speed and the detected refrigerant pressure are in the defrosting operation region; and
- control means for controlling the refrigeration cycle to start the defrosting operation in response to the stored defrost flag and starting a charging operation of the charge means after the defrosting operation.

16. An air conditioner system of claim 15, wherein the control means is further for stopping the defrosting operation when the detected refrigerant pressure exceeds a predetermined pressure.

17. An air conditioner system of claim 15, wherein the control means is further for setting the predetermined pressure to be lower as an exterior air temperature is lower.

18. An air conditioning method for an electric vehicle having a secondary battery chargeable with an electric power from an external power source for driving the vehicle and a refrigeration cycle including an electrically driven compressor, the method comprising the steps of:
- monitoring an operation of the refrigeration cycle while the vehicle is driven;
- checking whether a defrosting operation of the refrigeration cycle is necessitated from the monitored operation of the refrigeration cycle in a previous driving of the vehicle, when the vehicle is at rest and a charging of the secondary battery with the external power source is instructed;

driving the refrigeration cycle with the external power source to execute the defrosting operation when the defrosting operation is necessitated; and charging the storage battery with the external power source after the defrosting operation.

19. An air conditioning method of claim 18, wherein the checking step determines a necessity of the defrosting operation when the monitored operation indicates that a heating operation continued for a predetermined time period under a predetermined low exterior air temperature.

20. An air conditioning method of claim 18, wherein the checking step determines a necessity of the defrosting operation when a compressor rotation speed and a refrigerant pressure in the refrigeration cycle are within a defrosting range determined by the compressor rotation speed and the refrigerant pressure.

* * * * *